United States Patent [19]

Leitert et al.

[11] 4,380,682

[45] * Apr. 19, 1983

[54] BALANCED CHLORINATION PROCESS

[75] Inventors: Frederick C. Leitert, North Madison; Carl G. Vinson, Jr., Mentor, both of Ohio

[73] Assignee: Diamond Shamrock Corporation, Dallas, Tex.

[*] Notice: The portion of the term of this patent subsequent to Nov. 7, 1995, has been disclaimed.

[21] Appl. No.: 351,219

[22] Filed: Feb. 22, 1982

Related U.S. Application Data

[63] Continuation of Ser. No. 782,974, Mar. 30, 1977, which is a continuation-in-part of Ser. No. 734,249, Oct. 20, 1976, Pat. No. 4,124,534.

[51] Int. Cl.$^3$ .............................................. C07C 17/152
[52] U.S. Cl. .................... 570/219; 570/222; 570/224; 570/243; 570/223
[58] Field of Search ............... 570/222, 223, 234, 241, 570/219

[56] References Cited

U.S. PATENT DOCUMENTS

| | | | |
|---|---|---|---|
| 3,184,515 | 5/1965 | Penner et al. | 260/658 |
| 3,427,359 | 2/1969 | Rectenwald et al. | 260/659 |
| 3,594,428 | 7/1971 | Antonini et al. | 260/654 H |
| 3,642,918 | 2/1972 | Bohl et al. | 260/654 A |
| 3,923,913 | 12/1975 | Antonini et al. | 260/654 H |
| 3,926,847 | 12/1975 | Beard, Jr. et al. | 252/441 |

Primary Examiner—Charles F. Warren
Assistant Examiner—Joseph A. Boska
Attorney, Agent, or Firm—John J. Freer

[57] ABSTRACT

The present invention relates to a novel process of halogenating aliphatic hydrocarbons which comprises, first non-selectively oxyhalogenating a $C_2$–$C_6$ aliphatic hydrocarbon to a partially halogenated intermediate product having an overall avarage empirical formula in which the atomic ratio of halogen to carbon is greater than 1:1, then vapor phase halogenating said intermediate product to form an end product having an atomic ratio of carbon to hydrogen is at least 2:1; thereby selectively coproducing or consuming hydrogen chloride.

6 Claims, No Drawings

BALANCED CHLORINATION PROCESS

CROSS REFERENCE TO RELATED APPLICATIONS

This is a continuation, of application Ser. No. 782,974, filed Mar. 30, 1977 which in turn is a continuation-in-part of application Ser. No. 734,249 filed Oct. 20, 1976, now issued as U.S. Pat. No. 4,124,534.

BACKGROUND OF THE INVENTION

The production of halogenated, and particularly chlorinated hydrocarbon products by use of the so-called Deacon process, or modifications thereof is, of course, well known in the art. In general, this comprises oxyhydrochlorination, usually at a temperature of about 300° C., employing a metal chloride (usually a copper chloride) catalyst impregnated on a substantially inert support such as silica or alumina or silica-alumina, or the like. It is also known that a modifying alkali metal chloride, such as potassium chloride, can be employed with the copper chloride, to suppress the volatility of copper chloride.

In the past, those skilled in the art have generally sought so-called "selective chlorination," employing a "selective catalyst." That is to say, they sought a catalyst which would provide highly selective chlorination of the hydrocarbon feedstock to a very high yield (90% or better) of a single predetermined chlorinated hydrocarbon end product, minimizing the amounts of related chlorinated hydrocarbons produced as by-products. Therefore, in the past, the efficiency of a catalyst was judged by its ability to selectively produce, for example, ethylene dichloride, in yields in excess of 90 and preferably in excess of 95%, with corresponding low conversions to other chlorinated hydrocarbons of the ethylene/ethane series, and/or carbon oxides. In the chlorination of ethylene and/or ethane, to ethylene dichloride, one would, of course, expect to also produce at least trace amounts of vinyl chloride, dichloroethylenes, trichloroethylene, trichloroethane, perchloroethylene, tetrachloroethane, and pentochloroethane.

One of the more widely employed commercial catalysts for the oxyhydrochlorination of ethylene in a fluid bed reactor will yield about a 95% conversion of ethylene to ethylene dichloride, with only trace amounts of other chlorinated hydrocarbons. This catalyst, however, can only be employed for production of ethylene dichloride since the higher temperature (above about 260° C.) and/or higher HCl:ethylene ratios, required to produce a greater depth of chlorination, result in loss of fluidization, and then agglomeration of the bed. Also, the remaining 5% is predominantly carbon dioxide and carbon monoxide, which constitute easily separable, but unsalvageable by-products.

The inability to provide a depth of chlorination greater than ethylene dichloride in the oxychlorination step creates significant economic as well as environmental problems. Where the ultimate desired end product is tri- or perchloroethylene, a process which can provide oxyhydrochlorination only to ethylene dichloride will require a subsequent vapor phase chlorination to produce the desired end product. In the vapor phase chlorination, the partially chlorinated hydrocarbon and chlorine gas are reacted at 380° C. to 550° C. in an oxygen-free environment, with or without a catalyst (e.g., silica-alumina catalyst) to produce the highly chlorinated hydrocarbon end product and HCl. Such a combination of processes will result in an overall stoichiometric imbalance of the type described by the following equation:

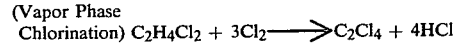

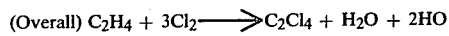

Thus, the subsequent vapor phase chlorination reaction produces four moles of hydrochloric acid, only two of which can be recycled to the oxyhydrochlorination reactor. This creates a "captive" producer of significant quantities of hydrogen chloride, often in excess of all internal and external demand. The ratio of coproduct hydrogen chloride to chlorinated hydrocarbon end product is thus fixed, resulting in a process which is incapable of meeting changing market conditions for hydrogen chloride or chlorinated end product.

There are, of course, a wide variety of teachings in both the technical and patent literature with regard to catalysts and process modifications in the oxyhalogenation of hydrocarbons. Many of these report results in which ethylene, for example, is oxyhydrochlorinated to a depth of chlorination greater than EDC, usually through the use of a particular catalyst, but these teachings apparently cannot be successfully scaled up to a variable continuous commercial process in which the ratio of coproduct hydrogen chloride to chlorinated end product can be varied to meet changing market conditions. There have also been proposals to, in essence, fractionate the chlorinated hydrocarbon product and recycle lower chlorinated by-products back into the original OHC reactor. For example, Japanese Patent Publication 1970/34801, Ichiki et al, discloses oxychlorination or oxyhydrochlorination of ethylene at 500° C. to produce a mixture which is predominantly trichloroethylene with any lower chlorinated by-products being recycled to the reactor with excess gaseous hydrogen chloride.

U.S. Pat. No. 3,642,918 to Bohl et al. discloses and claims a two-step oxychlorination and/or oxyhydrochlorination process in which a $C_2$ hydrocarbon is oxychlorinated at a temperature of about 290° C. to about 390° C. to a chlorinated product of the composition $C_2H_xCl_y$ where "x" is from 1 to 3.3 and "y" is from 2.4 to 4. This first product is then fed with further oxygen to a second oxychlorination reactor which is operated at a temperature from about 370° C. to 445° C., inclusion of additional chlorinating agent in the second feed being optional. The real thrust of the Bohl et al teaching, however, is that the primary purpose of the second OHC reaction is not the further chlorination of the hydrocarbon molecule, but conversion of a partially chlorinated saturated hydrocarbon to a chloro olefin. Bohl did not contemplate, and can not provide, control of the production of hydrogen chloride coproduct.

SUMMARY OF THE INVENTION

The present invention relates to a novel process of halogenating aliphatic hydrocarbons which comprises, first non-selectively oxyhalogenating a $C_2$–$C_6$ aliphatic hydrocarbon to a partially halogenated intermediate product having an overall average empirical formula in which the atomic ratio of halogen to carbon is greater than 1:1, then vapor phase halogenating said intermediate product to form an end product having an atomic ratio of carbon to hydrogen of at least 2:1; thereby controlling the amount of coproduct HCl.

The process of the present invention involves nonselective oxyhalogenation of aliphatic hydrocarbons to a mixture of corresponding saturated and unsaturated halogenated hydrocarbon compounds having a closely controlled predetermined overall average empirical formula; and the unfractionated mixture can then be converted to a more deeply halogenated hydrocarbon product, e.g., to tri- and prechloroethylene by conventional vapor phase techniques. The mixture can also be fractionated by conventional techniques to remove desirable end products and the intermediate fractions subsequently vapor phase halogenated.

The process of the present invention can thus be employed to achieve, stoichiometric balance or selective imbalance with respect to HCl in the combined oxyhydrochlorination/vapor phase chlorination procedure. For example, in the oxyhydrochlorination of ethylene to produce a mixture of chlorinated hydrocarbon products of a specific desired overall empirical formula, for subsequent vapor phase chlorination to perchloroethylene, while selectively being able (a) to employ and utilize any excess hydrogen chloride which may be available, e.g.:

(OHC) $C_2H_4 + 4HCl \xrightarrow{AIR/O_2} C_2Cl_4 + 4H_2O$ (b) to produce excess hydrogen chloride should this be desirable, e.g.:

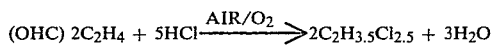
(OHC) $2C_2H_4 + 5HCl \xrightarrow{AIR/O_2} 2C_2H_{3.5}Cl_{2.5} + 3H_2O$

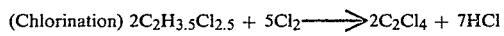
(Chlorination) $2C_2H_{3.5}Cl_{2.5} + 5Cl_2 \longrightarrow 2C_2Cl_4 + 7HCl$

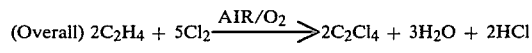
(Overall) $2C_2H_4 + 5Cl_2 \xrightarrow{AIR/O_2} 2C_2Cl_4 + 3H_2O + 2HCl$ (c) operate as a completely balanced system in which the hydrogen chloride produced by the system, exactly balances that which is required, e.g.:

(OHC) $C_2H_4 + 3HCl \xrightarrow{AIR/O_2} C_2H_3Cl_3 + 2H_2O$

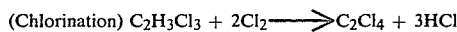
(Chlorination) $C_2H_3Cl_3 + 2Cl_2 \longrightarrow C_2Cl_4 + 3HCl$

(Overall) $C_2H_4 + 2Cl_2 \xrightarrow{AIR/O_2} C_2Cl_4 + 2H_2O$

Thus, in the reactions illustrated by the equation (a) above, 4 moles of hydrogen chloride are required for each mole of perchloroethylene produced, thus requiring an available excess hydrogen chloride; while in equation (b) 3.5 moles of hydrogen chloride are produced in the vapor phase chlorination reaction, only 2.5 of which can be recycled to the OHC reactor, so that the overall reaction results in the net production of 1 mole of excess hydrogen chloride for each mole of perchloroethylene produced. In equation (c) the 3 moles of hydrogen chloride produced in the vapor phase chlorination process can be recycled to the OHC reactor and will exactly offset the 3 moles of hydrogen chlorided needed for the OHC process.

PREFERRED EMBODIMENT

The present inventiion relates to a novel process of halogenating aliphatic hydrocarbons which comprises the steps of:

(a) Non-selectively oxyhalogenating said aliphatic hydrocarbon to a partially halogenated intermediate product having an overall average empirical formula, the atomic ratio of halogen to carbon in said empirical formula being greater than 1:1, said oxyhalogenation being carried out in a fluid bed reactor and under reaction conditions which include a temperature of from about 340° C. to about 450° C., a pressure of 0 to about 200 psi gauge, and a contact time of from about 1 to about 30 seconds;

(b) Adjusting said reaction conditions to control the halogen to carbon ratio of said empirical formula of said intermediate product;

(c) Vapor phase halogenating said intermediate product by reacting it with chlorine gas at 400° C. to 500° C., and in the presence of a silica-alumina catalyst to form an end product having an atomic ratio of carbon to hydrogen of at least 2:1; and (d) Adjusting the halogen to carbon ratio of said empirical formula of said intermediate to control the quantity of hydrogen halide by-product formed in said vapor phase halogenation reaction.

The following example will serve by way of illustration, and not by way of limitation, to describe the experimental procedures which were employed in the preparation of the catalyst, and in conducting the laboratory oxyhydrochlorination reactions from which the data of Tables II, III and IV were developed in which it was evaluated.

CATALYST PREPARATION

The catalyst was generally prepared by standard procedures well known to those skilled in the art, such as by vacuum impregnation of the support, vacuum filtration of excess impregnating solution, drying and sieving of the dried catalyst prior to charging to the reactor.

In preparing a standard 300 cc charge of catalyst for the reactor, 400 grams of the desired support was placed in a flask connected to a separatory or addition funnel, and aspirated for twenty minutes before addition of the impregnating solution. The impregnating solution was prepared by dissolving the requisite amounts of copper chloride and potassium chloride in deionized water. The solution was run onto the support in a thin stream and the flask was tilted and rolled to distribute the stream evenly over the support. In order to facilitate subsequent handling, the volume of impregnating solution added to the aspirated support was approximately twice the volume to be imbibed into the pores of the support. The slurry was shaken under full aspiration for approximately two minutes, with the total contact between the support and the impregnating solution being limited to four minutes overall (from the start of impregnation) in order to limit any potential preferential absorption by the support of one of the individual catalyst salts. On release of the vacuum, the slurry was vigorously shaken for about one minute, and filtered through a Buchner funnel. Aspiration of the filter cake was continued for from about 40 to about 60 minutes to clear the interstices of the wet cake of as much excess impregnating solution as possible, so as to minimize the coating of catalyst salts on the exterior of the particles. The filtered cake was transferred to a ceramic dish, and dried at 150° C. for eight hours, after which the dried solids were sieved through a 60 mesh screen, with oversized particles being discarded.

OHC EVALUATION

The OHC reaction was carried out in a fluid bed vertical reactor having a 1.5-inch ID cylindrical Pyrex reaction zone. Either an 18-inch or a 24-inch cylinder was employed depending upon the designated contact time. Cylinder ethylene, HCL, and air (metered at 10 psig with calibrated rotameters) were mixed in a pipe tee, and fed without preheating to the bottom of the distributor plate) to which the bottom of the reactor had been sealed.

The top of the reactor, at a point above the top of the catalyst bed was sealed to a bulbous upper section having an access port at its top which served as a charging port for addition of the catalyst. The access port had a standard taper joint to accommodate a one-hole rubber stopper through which a 5 mm. ID Pyrex thermowell was inserted during operation of the reactor, so that the thermowell was positioned vertically along the axis of the reactor, and extended to within one inch off the frit. The reactor surfaces from the frit to the top of the upper section were heated via a helical winding of 20-gauge Nichrome wire, the turns being spaced at about ⅝ inch over the cylindrical section and at about 1 inch over the enlarged surface of the upper section. The windings on the vertical surfaces were covered with fiberglass pipe insulation, with bed fluidization and particle motion being observed through long vertical holes in the insulation. Reactor effluent gasses were taken off through a separate egress port in the upper section through a 9 mm. ID tube. The reaction effluent gasses passed from the 9 mm. tube through a isopropyl alcohol cooled (0° C.) helical condenser to a collection flask immersed in an isopropyl alcohol dry ice mixture, the top of the collecting flask being connected to a thimble condenser having a 3×12-inch cavity which was also packed with an isopropyl alcohol dry ice mixture.

OPERATING PROCEDURE

Where a 10-second contact time was desired, the 18-inch cylindrical section was employed and was charged with 300 cc of loosely packed catalyst. Where a 15-second contact time was desired, the 24-inch cylindrical reaction zone was employed, and was charged with 450 cc of catalyst. Once charged, the reactor was positioned with the cylindrical section in a vertical position, and air was passed through the catalyst bed at about one liter per minute through the heated reactor to drive off any last traces of moisture. When the bed had expanded, the thermowell was aligned and secured, with the thermocouple normally located at about an inch above the bottom of the thermowell. Fluidization was normally observed after the catalyst had reached a temperature of about 300° C., (the air flow being increased and/or the thermowell being used to stir the bed, if any stagnant zones were observed). Once the catalyst was moving freely, the feed gases were set at the predetermined rates, the temperatures brought to the desired level, and the reactor was run, if possible, for 16 hours at a given set of conditions, before collecting condensate for analysis or analyzing of samples of the uncondensed gas. Analysis of organic liquid and gaseous effluents were performed by gas chromatography.

TEST CATALYST

Unless either otherwise indicated or clear from the context, the term "Catalyst" refers to a catalyst prepared by impregnating Alcoa A-3 alumina with 3.9 weight percent copper chloride and 2.4 weight percent potassium chloride, a total loading of catalyst salts of about 6.3%, and a K:Cu atomic ratio of 1.1:1. It should be clearly understood, however, that this is merely one of a wide number of specific catalysts which would fall within the preferred ranges of the novel catalysts disclosed and claimed in our copending Application Ser. No. 734,249, filed Oct. 20, 1976, and that it merely happens to be the specific catalyst arbitrarily selected for evaluation in early testing, and thereafter employed to provide a valid basis for comparative evaluation. In general preferred catalyst for use in the oxyhydrochlorination of the present invention is copper chloride modified by potassium chloride impregnated on an alumina support, said support having an alumina content of 98% to 99.5%, from about 0.5% to about 1% sodium oxide, a silica content less than 0.5%, an average particle size of from about 90 to about 120 microns, and an average surface area from about 2 to about 5 square meters per gram; the total loading of catalyst salts being from about 5% to about 8% and the atomic ratio of potassium to copper being in the range of from about 0.9:1 to 1.2:1.

It is desirable that supports with cul de sac pores be excluded. Such pores would tend to trap the hydrocarbon gases or molecules and promote their oxidation. In both oxychlorination and oxhydrochlorination it is considered desirable that the average pore diameter be in the range of 1000 to 5000 Angstroms.

It should also be clearly understood that the total loading of catalyst salts and the ratio of potassium to copper discussed herein, refer to the catalyst in use. In other words, these would be the loading of catalyst salts and atomic ratios for the freshly-prepared catalyst employed in the original charge to the reactor.

In commercial OHC reactors, elutriation losses of 10% or more per year are not uncommon, and "makeup catalyst" is added from time to time to replace these losses. It is also to be anticipated, that the use of the catalyst of the present invention in a commerical reactor over a prolonged period would also result in a gradual evaporation loss of cupric chloride. The evaporation loss would be expected to vary according to reaction conditions, particularly temperature.

For example, it has been calculated that while only about 0.5% of the cpuric chloride would evaporate in a year's use at temperatures of approximately 340°-350° C., at temperatures of 420° C., losses of 3-6% or more could be encountered. For this reason, the catalyst loading and particularly the ratio of potassium chloride to copper chloride in the make-up catalyst may have to be adjusted to a significantly higher copper chloride level, so that when the make-up catalyst is added to the reactor, and admixed with the catalyst already present, the overall atomic ratio of potassium to copper in the bed will be adjusted to approximately that of the fresh catalyst salts originally charged to the reactor.

While it is possible to closely approximate the copper chloride evaporation losses by calculation based on reaction conditions, it is clearly preferable to adjust the potassium to copper ratio in the make-up catalyst by actual quantitative data. This data can be acquired directly from analysis of periodic samplings of the catalyst bed, or indirectly, from any of a number of sources, such as monitoring of the copper content of the aqueous condensate from the reactors.

Table I contrasts the reaction products produced by the commercial OHC catalyst (at 230° C.) with those produced according to the present invention (in a pilot plant reactor) at reactor temperature of 310° C., 340° C. and 380° C., respectively. The commercial catalyst comprises an alumina having a surface area of 180 m²/gm, a Na₂O content of 0.02% and a 14% loading of copper chloride. The pilot plant experiments employed a six-inch diameter nickel reactor. These pilot scale experiments yielded results consistent with, and equivalent to, those observed in the bench scale experiments. The pilot scale reactor also permitted investigation of increased pressures and superficial gas velocity.

The results for the commercial catalyst are based on actual commercial experience. For this reason, there was no specific separate analysis of the amounts of each of the other individual chlorinated ethylene products present, however, all of these products taken cumulatively represent little more than trace amounts. Attempts to employ the commercial catalyst at temperatures in excess of 260°0 C., or to employ feeds having an HCl to ethylene ratio in excess of 2:1, caused loss of fluidization and agglomeration of the bed.

In examining Table I, it will be noted that in accordance with accepted practice, the feed ratio of ethylene:hydrogen chloride:air is varied according to the depthh of chlorination anticipated. In tables hereinafter, catalyst salts are adjusted to provide higher loadings for supports having a higher surface area. Such changes represent accepted techniques well known to those skilled in the art, for adjusting known variables to maintain optimum reaction conditions.

In the case of the commerical catalyst, HCl:ethylene ratios in excess of 2:1 result in loss of fluidization and agglomeration of the bed. In all other cases the feed ratio represents the approximate optimum feed ratio based on the previously-observed depth of chlorination obtained at the given temperatures. A higher ratio of hydrogen chloride to ethylene did not result in any significant change in the depth of chlorination obtained.

Table II illustrates the flexibility of the catalyst of the present invention both as to empirical formula of the product produced, the variety of feedstocks which can be employed, and the fact that equivalent results can be obtained from either oxyhalogenation or oxyhydrohalogenation.

TABLE I

| | Product Using Commercial Catalyst* | Product According to Present Invention | | |
|---|---|---|---|---|
| Reactor Temperature (°C.) | 230 | 310 | 340 | 380 |
| Operating Pressure (Psig) | 45 | 45 | 45 | 45 |
| Molar Feed Ratio (C₂H₄:HCl:AIR) | 1:2:4 | 1:2.2:4 | 1:3:6 | 1:3.5:8 |
| Contact Time (Sec) | 25 | 20 | 20 | 20 |
| Superficial Velocity (Ft/Sec) | 1.6 | .4 | .4 | .4 |
| Reaction Products (Mole %) | | | | |
| VCM (C₂H₃Cl) | | 0.5 | 1.1 | 12 |
| DCE's (C₂H₂Cl₂) | | 0.7 | 4.5 | |
| EDC (C₂H₄Cl₂) | 95 | 86.5 | 50.3 | 8 |
| TCE (C₂H Cl₃) | | | 1.1 | 11 |
| TCA (C₂H₃Cl₃) | | 10.0 | 23 | 12 |
| PCE (C₂Cl₄) | — | 2.6 | 24.4 | |

TABLE I-continued

| | Product Using Commercial Catalyst* | Product According to Present Invention | | |
|---|---|---|---|---|
| TET (C₂H₂Cl₄) | | 1.5 | 13.5 | 11 |
| PENTA (C₂HCl₅) | | 0.2 | 4.5 | 11 |
| Percent Saturation (%) | | 99 | 94 | 45 |
| Average Formula | (1) | (2) | (3) | (4) |
| Ethylene Conversion (%) | 95 | 90 | 98 | 100 |
| Ethylene Selectivity (%) | | | | |
| Chlorohydrocarbons | 95 | 98.7 | 96 | 94.5 |
| Carbon Oxides | 5 | 1.3 | 4 | 5.5 |

*Commercial Catalyst-14% by weight CuCl₂ on alumina with 0.02% Na₂) and a surface area of 180 m²/gm.
(1) C₂H₄Cl₂
(2) C₂H₃.₉Cl₂.₁
(3) C₂H₃.₂Cl₂.₇
(4) C₂H₁.₆Cl₃.₃

TABLE II

FEEDSTOCK FLEXIBILITY
OHC AND OC TO PCE AND TCE

| | 1 | 2 | 3 | 4 | 5 |
|---|---|---|---|---|---|
| FEED RATIO | | | | | |
| C₂H₄:HCl:AIR | 1:4:9 | | | | |
| C₂H₄:Cl₂:AIR | | 1:2:5 | | | |
| EDC:Cl₂:AIR | | | 1:1:5 | | |
| EDC:Cl₂:O₂ | | | | 1:1:1 | |
| VHE*:Cl₂:AIR | | | | | 1:0.75:4.5 |
| REACTION PRODUCTS (%) | | | | | |
| VCM, DCE's, EDC | 9.5 | 6 | 4 | 6 | 6 |
| CCl₄ | 0.2 | 1 | 2 | 1 | 1 |
| TCE | 19 | 17 | 17 | 19 | 17 |
| PCE | 58 | 58 | 60 | 56 | 53 |
| TCA, TETRA's, PENTA | 6.5 | 8.5 | 7.5 | 13.5 | 13.5 |
| HEXA (C₂Cl₆) | 0.2 | 1 | 1 | 0 | 0 |
| HCB, HCBD (C₆Cl₆, C₄Cl₆) | 0.1 | 0.5 | 0.5 | 0.5 | 0.5 |
| EMPIRICAL FORMULA | (1) | (2) | (3) | (4) | (5)** |
| ETHYLENE YEILD (%) | | | | | |
| CHLOROHYDROCARBONS | 93.5 | 92 | 92 | 96 | 91 |
| CARBON OXIDES | 6.5 | 8 | 8 | 5 | 8 |

All at 420° C., 10 Sec. Contact Time
*unfractionated heavy ends from a commercial vinyl chloride reactor
**(1) C₂H₀.₈₂Cl₃.₅₇
(2) C₂H₀.₅₉Cl₃.₈₄
(3) C₂H₀.₄Cl₃.₈₄
(4) C₂H₀.₆₅Cl₃.₇₈
(5) C₂H₀.₆₇Cl₃.₇₆

Table III illustrates one of the ways in which the empirical formula of the intermediate product can be controlled by adjusting the reactor conditions of the oxyhalogenation reaction. From an examination of Table III it will be clear that as the temperature is increased from about 330° C. to about 400° C., the degree of unsaturation and the depth of chlorination substantially increase, with the atomic chlorine to carbon ratio of said intermediate product reaching 1.2:1 at a temperature of 340° C. At 330° C. the intermediate product is only 27 percent unsaturated and a chlorine to carbon ratio is below 1.2:1, while at 400° C., the intermediate product is 86 percent unsaturated, and the ratio of chlorine to carbon is almost 1.8:1.

It should, of course, be clearly understood that while Table III illustrates the use of variations in temperature to control the depth of chlorination in the intermediate product, the reaction could be carried out at constant temperature and the adjustment of the empirical formula of the end product achieved by varying any of a wide variety of other reaction conditions including, for example, pressure, contact time, feed ratio, chlorine source, or even catalyst composition. On the other hand, it is also obvious that temperature is perhaps the most readily adjustable and the most accurately controllable variable and, therefore, the preferred means of achieving suitable adjustment of reaction conditions.

Because of the greater ease of handling, it is highly probable that the most expedient procedure would be to transfer all of the intermediate product from the oxyhalogenation reactor to the vapor phase halogenation reactor, however, this is by no means essential, particularly where both trichloro- and perchloroethylene and being produced. If desired, the intermediate product can be fractionated, the trichloro- and/or perchloroethylene removed, and only the remaining hydrocarbon products cycled to the vapor phase reactor.

Thus, referring again to Table III, it will be noted that the reaction at 400° C. produced an intermediate vapor phase reaction and recycled to the oxyhalogenation reactor, making it a particularly attractive procedure where there is a substantial quantity of excess hydrogen chloride available. In the absence of such a substantial excess of hydrogen chloride, it may, of course, be necessary to use some quantities of chlorine gas in the oxyhalogenation reactor.

Table IV illustrates the effect of catalyst composition on the empirical formula of the intermediate product, especially the ratio of copper to potassium in the particular catalyst employed in this particular illustration. Again, while temperature is generally the more desirable variable for control of the empirical formula, it is clearly not the only such variable. In fact, in the course of prolonged commercial runs, catalyst evaporation and the addition of make-up catalysts, will generally introduce a continuing series of variations in catalyst composition, which must be controlled.

TABLE III

Effect of Temperature on Reaction Product Mix

| Temp °C. | Molar Feed Ratio $C_2H_4$: HCl:Air | $C_2H_4$ Conv. | % Carbon Selectivity to Products** | | | | | | | | | | | % Organic Unsat. | Empirical Formula or Organic on $C_2$ Basis** |
|---|---|---|---|---|---|---|---|---|---|---|---|---|---|---|---|
| | | | CO + CO2 | VCM | DCE | EDC | CCl4 | TCE | TCA | PCE | Tetra | Penta | Hexa | | |
| 300 | 1:2.5:5 | 90 | 2 | — | — | 97 | — | — | 1 | — | — | — | — | 0 | $C_2H_{3.99}Cl_{2.01}$ |
| 310 | 1:2.5:5 | 98 | 2 | — | — | 88 | — | — | 10 | — | — | — | — | 0 | $C_2H_{3.9}Cl_{2.1}$ |
| 320 | 1:2.5:5 | 100 | 2 | 1.5 | 0.5 | 73.7 | 0.5 | — | 19 | — | 2.4 | 0.4 | — | 2 | $C_2H_{3.7}Cl_{2.26}$ |
| 330 | 1:3:6 | 100 | 2 | 23 | 3.3 | 34 | 0.7 | 0.5 | 27 | 0.5 | 7 | 2 | 0 | 27 | $C_2H_{3.16}Cl_{2.3}$ |
| 340 | 1:3:6 | 100 | 4 | 28 | 7 | 17 | 0.7 | 2.5 | 25 | 1 | 11 | 3.8 | — | 40 | $C_2H_{2.8}Cl_{2.4}$ |
| 350 | 1:3.5:7 | 100 | 4 | 30 | 16 | 2 | 0.7 | 11 | 13.6 | 3.3 | 12.4 | 7 | — | 62 | $C_2H_{2.3}Cl_{2.53}$ |
| 360 | 1:3.5:7 | 100 | 5.5 | 18 | 22 | 0.6 | 0.8 | 6 | 8 | 7 | 12 | 10 | 0.1 | 66 | $C_2H_{1.85}Cl_{2.83}$ |
| 380 | 1:4:8 | 100 | 4.5 | 8 | 14 | — | 0.6 | 30 | 3.7 | 17 | 10 | 12 | 0.2 | 72 | $C_2H_{1.31}Cl_{3.25}$ |
| 400 | 1:4:9 | 100 | 5 | 2.5 | 6 | — | 0.8 | 34 | 0.4 | 41 | 2 | 8 | 0.3 | 86 | $C_2H_{0.73}Cl_{3.55}$ |

10 Sec. Contact time based on settled bed and feed gas flow at conditions. Superficial feed gas velocity is 0.1 ft./sec.
**By on-line VPC.
***$CCl_4$ is converted to $C_2$ equivalent by treating as $C_2H_{-1}Cl_7$.

TABLE IV

Effect of Catalyst Composition on Activity of Catalysts

| Catalyst** | Temp. °C. | Molar Feed Ratio | Sel. to CO +CO2 | Empirical Formula of Organic Condensate | Liquid Comp., Mole % | | | Notes |
|---|---|---|---|---|---|---|---|---|
| | | | | | Vinyl | DCE | Total Unsat. | |
| 3.9% CuCl2 and | 330 | 1:3:6 | 4 | $C_2H_{3.42}Cl_{2.38}$ | 1.7 | 7.5 | 10 | Bed stagnant |
| 1.3% KCl, | 340 | 1:3:6 | 5.1 | $C_2H_{2.78}Cl_{2.58}$ | 11.6 | 16.7 | 32 | at bottom. |
| K:Cu = 0.6:1 | 350 | 1:4:8 | 6 | $C_2H_{2.01}Cl_{2.52}$ | 9.5 | 54.0 | 74 | |
| 3.9% CuCl2 | 340 | 1:3:6 | 4 | $C_2H_{2.85}Cl_{2.55}$ | 13.1 | 14.4 | 35 | |
| 1.6% KCl, | 350 | 1:4:8 | 6.5 | $C_2H_{1.73}Cl_{2.56}$ | 10.0 | 58.2 | 85 | |
| K:Cu = 0.75:1 | | | | | | | | |
| 3.7% CuCl2 and | 340 | 1:3:6 | 4 | $C_2H_{2.41}Cl_{2.14}$ | 25.8 | 41.6 | 72 | |
| 2.1% KCl; | 350 | 1:4:8 | 7.2 | $C_2H_{2.05}Cl_{2.3}$ | 16.2 | 55 | 82 | |
| K:Cu = 1:1 | 360 | 1:4:8 | 4 | $C_2H_{2.05}Cl_{2.57}$ | 9.1 | 48.0 | 69 | |
| 3.9% CuCl2 and | 340 | 1:3:6 | 3.8 | $C_2H_{2.54}Cl_{2.32}$ | 15.7 | 38.6 | 57 | |
| 2.4% KCl; | 350 | 1:4:8 | 9.4 | $C_2H_{1.98}Cl_{2.18}$ | 12.5 | 69.3 | 92 | |
| K:Cu-1.1:1 | 360 | 1:4:8 | 5.6 | $C_2H_{1.98}Cl_{2.69}$ | 7.5 | 48.7 | 67 | |
| | 370 | 1:4:8 | 5 | $C_2H_{1.73}Cl_{2.99}$ | 2.9 | 38.0 | 64 | |
| | 380 | 1:4:9 | 5.4 | $C_2H_{1.23}Cl_{3.44}$ | 1.2 | 20.4 | 67 | |
| | 390 | 1:4:9 | 6.4 | $C_2H_{1.2}Cl_{3.29}$ | 1.2 | 26.3 | 75 | |
| | 400 | 1:4:9 | 6.3 | $C_2H_{0.9}Cl_{3.49}$ | 0.7 | 16.8 | 71 | |
| 3.8% CuCl2 and | 340 | 1:3:6 | 4.5 | $C_2H_{3.25}Cl_{2.65}$ | 0.1 | 5 | 5 | |
| 2.5% KCl; | 350 | 1:4:8 | 5 | $C_2H_{2.62}Cl_{3.0}$ | 7.4 | 5.7 | 18 | |
| K:Cu = 1.2:1 | 360 | 1:4:8 | 5 | $C_2H_{2.2}Cl_{3.2}$ | 8.2 | 5.6 | 30 | |
| | 380 | 1:4:8 | 5 | $C_2H_{1.7}Cl_{3.3}$ | 7.6 | 8.1 | 50 | |
| | 400 | 1:4:9 | 6 | $C_2H_{1.2}Cl_{3.54}$ | 2.0 | 6.3 | 63 | |

*10-Second contact throughout based on settled bed and feed gas flow at conditions. Alcoa A-3 support.
**Calculated composition. K:Cu rations are calculated atomic ratios.

product containing 34 percent trichloro- and 41 percent perchloroethylene. In such a case, the remaining 20 percent of the intermediate product would have an empirical formula approximating $C_2H_{1.97}Cl_{2.78}$. Vapor phase halogenation of only a fraction of the intermediate product can, of course, substantially reduce the amount of hydrogen chloride by-product formed in the In order to maintain a valid base for comparison of the various test results, the foregoing discussion has been primarily directed at the chlorination of ethylene using a potassium chloride-copper chloride catalyst in a fluid bed reactor for the oxyhalogenation procedure. It should again be noted, however, that the foregoing Tables and experiments are presented by way of illustration and not by way of limitation. The process of the present invention is not limited to the chlorination of ethylene in a fluid bed but includes fixed or fluid bed oxyhalogenation and/or oxyhalogenation of a wide variety of olefin hydrocarbons, and partially halogenated derivatives.

It will, of course, be obvious that still other changes and variations, specific materials, procedures, apparatus and the like can be made without departing from the scope of the invention herein disclosed, and it is my intention to be limited only by the appended claims.

What is claimed is:

1. A process of halogenating aliphatic hydrocarbons which comprises the steps of:
   (a) non-selectively oxyhalogenating an aliphatic hydrocarbon to a partially halogenated intermediate product having an overall average empirical formula using as the halogen source a member from the group consisting of chlorine, hydrogen cloride, and mixtures of chlorine and hydrogen chloride, the atomic ratio of halogen to carbon in said empirical formula being greater than 1:1, said oxyhalogenation being carried out in a fluid bed reactor containing a catalyst consisting essentially of cupric chloride modified with a modifying metal chloride selected from the group consisting of potassium chloride, calcium chloride and barium chloride and impregnated onto an alumina support, said alumina support having an alumina content of from about 98% to about 99.5% by weight, a sodium oxide content of from about 0.5% to about 1%, a silica content less than 0.5%, an average particle size of from about 90 to about 120 microns, and an average surface area from about 2 to about 5 $m^2/gm$; the total loading of catalyst salts being in the range of from about 5% to about 8% by weight and the atomic ratio of the metal of said modifying metal chloride to copper being in the range of from about 0.5:1 to about 1.2:1 and the reaction conditions in said reactor including a temperature of from about 340° C. to about 450° C., a pressure of 0 to about 200 psi gauge, and a contact time of from about 1 to about 30 seconds;
   (b) adjusting said reaction conditions to control the halogen to carbon ratio of said empirical formula of said intermediate product;
   (c) further halogenating said intermediate product by reacting it with halogen gas in the absence of oxygen at 400° C. to 500° C., and in the presence of silica-alimina catalyst to form an end-product having an atomic ratio of carbon to hydrogen of at least 2:1; and
   (d) adjusting the halogen to carbon ratio of said empirical formula of said intermediate product so as to control the quantity of hydrogen halide by-product formed in said further halogenation reaction.

2. The process according to claim 1 wherein said aliphatic hydrocarbon is ethylene, and said end product is a member selected from the group consisting of trichloroethylene, perchloroethylene, and mixtures of trichloroethylene and perchloroethylene.

3. The process according to claim 1 wherein said catalyst is impregnated on an alpha alumina support, and wherein said modifying metal chloride is potassium chloride.

4. The process according to claim 1 wherein said catalyst is an admixture of used catalyst which has already been employed in fluid bed halogenation, and make-up catalyst; said used catalyst having an atomic ratio of modifying metal to copper in excess of 1.2:1, said make-up catalyst having an atomic ratio of modifying metal to copper of less than 0.5:1, and said admixture having an atomic ratio modifying metal to copper in the range of from 0.5:1 to about 1.2:1.

5. The process according to claim 3 wherein said adjusting of said reaction conditions comprises adjusting the temperature in said fluid bed reactor.

6. The process according to claim 3 wherein the quantity of said hydrogen chloride by-product formed in said vapor phase halogenation reaction is substantially equal to the quantity of hydrogen chloride consumed in the oxychlorination reaction.

* * * * *